July 10, 1962

R. M. TUCK 3,043,161

TRANSMISSION

Filed April 25, 1956

INVENTOR.
Robert M. Tuck
BY
T. L. Chisholm
ATTORNEY

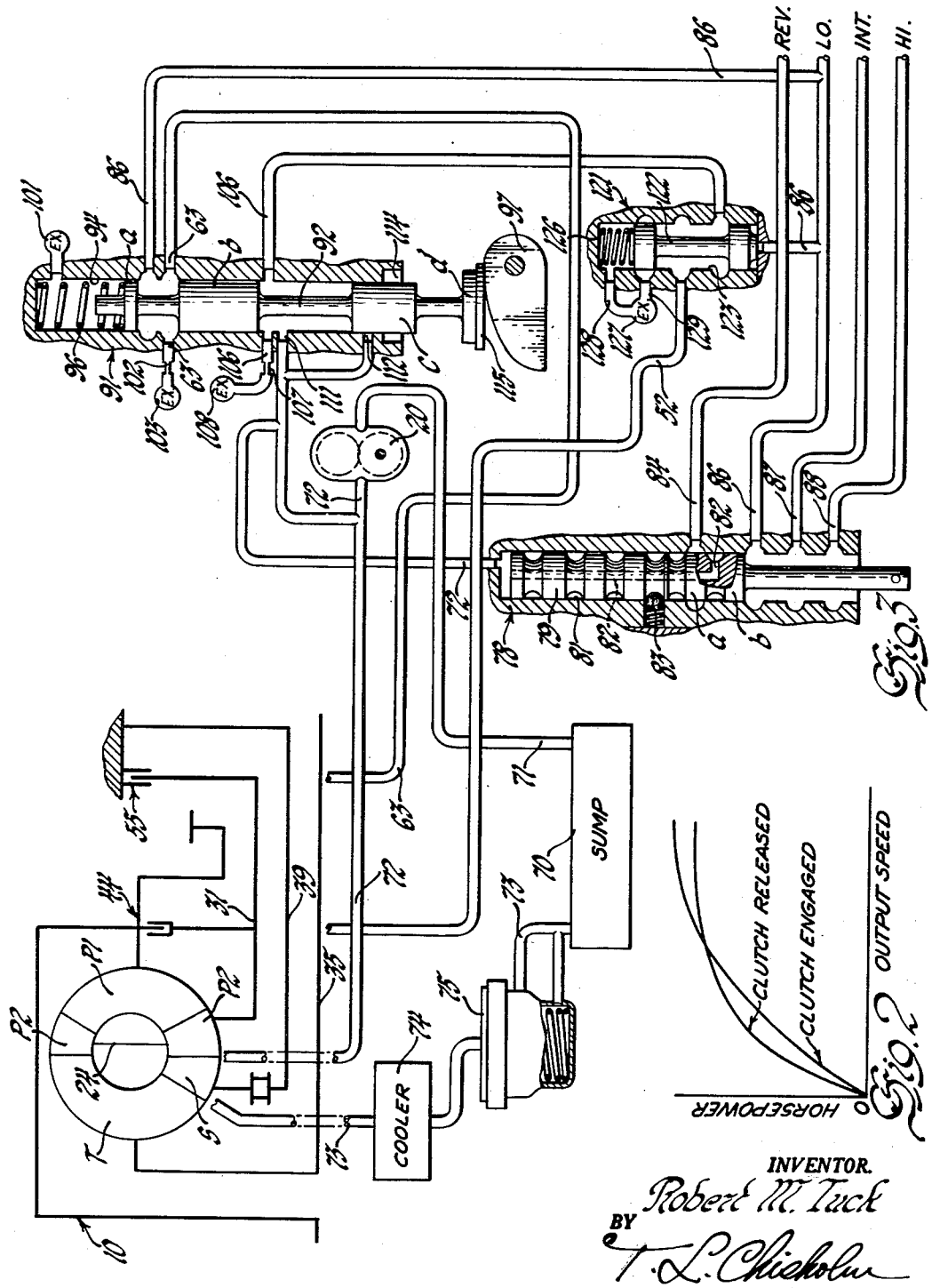

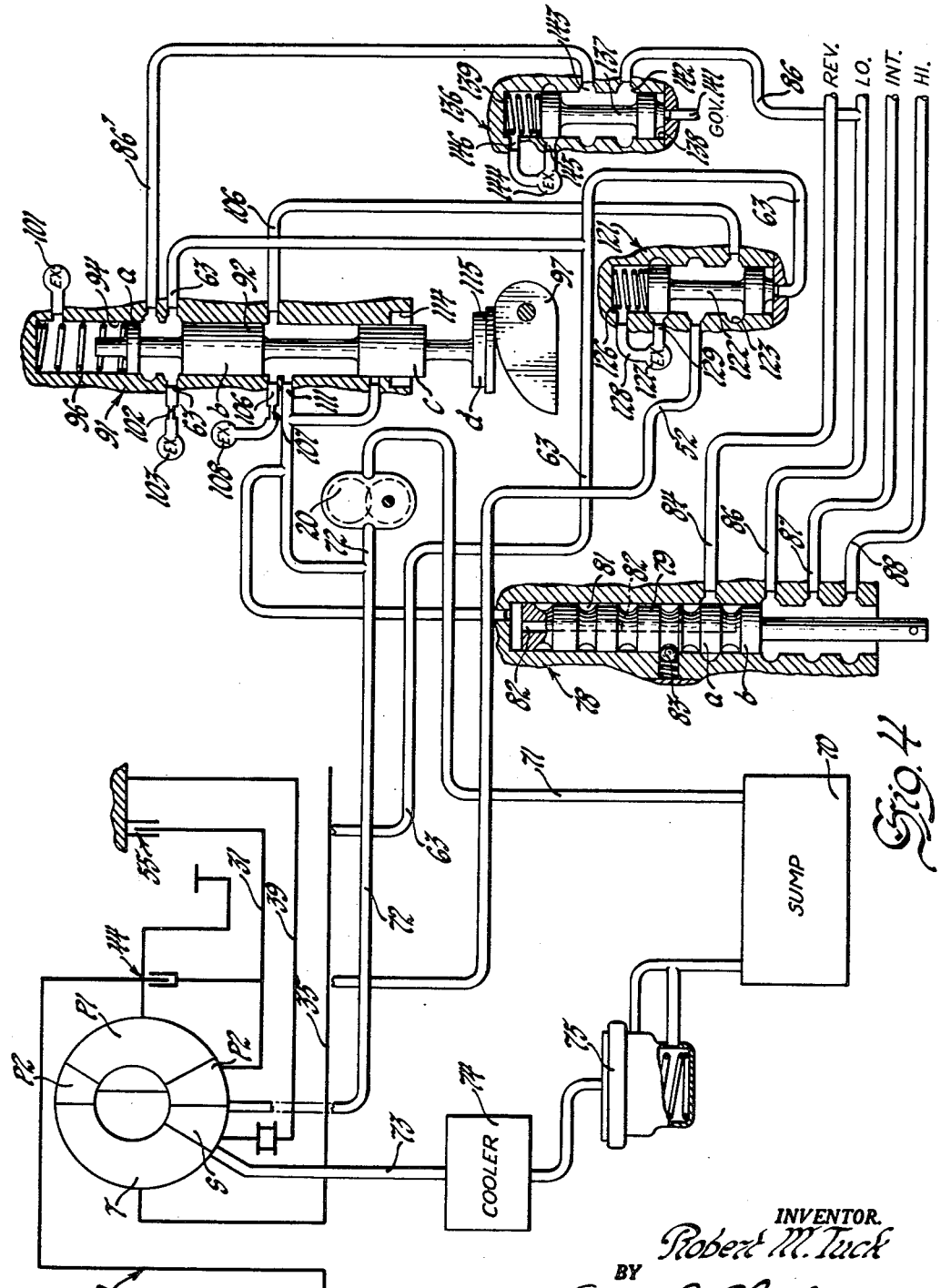

United States Patent Office 3,043,161
Patented July 10, 1962

3,043,161
TRANSMISSION
Robert M. Tuck, Indianapolis, Ind., assignor to General Motors Corporation, Detroit, Mich., a corporation of Delaware
Filed Apr. 25, 1956, Ser. No. 580,631
38 Claims. (Cl. 74—645)

This invention relates to an automatic transmission and more particularly a torque converter having a dual capacity pump and churn brake.

The selection of the proper capacity torque converter to be employed with a specific size engine for use under certain service conditions always involves a compromise between obtaining maximum horsepower at the driven member and obtaining the best economy. When a small capacity converter is used, the engine will operate at a higher speed and thus provide maximum horsepower at the driven element but there is a sacrifice in efficiency. When a larger torque converter is employed, though the average efficiency will be improved due to the better efficiency at part throttle, the converter will place a larger load on the engine at lower speeds and thus defer acceleration and reduce the horsepower output delivered to the driven element during many phases of operation. It is therefore desirable to provide a converter having a dual capacity, a high capacity for normal operation providing high efficiency and a low capacity to provide maximum performance or high horsepower output for acceleration. In accordance with this invention, the torque converter is provided with two pump members, the first pump is always driven by the engine while the second pump member is controlled by a clutch so that it may at times be driven by the engine to augment the first pump. When the first pump is used alone, the low capacity converter will permit the engine speed to increase more rapidly to develop maximum horsepower and thus the power plant will provide a higher horsepower at lower output speeds. When the first and second pump members are clutched together to operate as a unit, the large capacity converter will more efficiently provide a lower horsepower output at low output speeds, since the engine speed will be insufficient to develop maximum horsepower, but will provide slightly more horsepower at high engine speeds where the engine develops full horsepower due to the higher efficiency of the larger converter.

Since this dual range converter with the hydrodynamic braking feature is more advantageously employed with a multiratio transmission, the applicant's control system illustrates the fundamental relation of the converter and ratio change portions of the transmission controls. The first and second pumps are clutched together when the transmission is in the higher ratios, for example, intermediate and high ratios or equivalent ranges where automatic transmissions having range control are employed with this converter. When the throttle is advanced to the detent position, the clutch is released to provide high performance for passing or hill-climbing. This clutch may also be released for high performance when the transmission is in low ratio.

The second pump may also be employed to provide hydrodynamic braking by providing a brake to hold the second pump stationary. The control system operates to hold the second pump stationary to provide hydrodynamic braking when the transmission is in low range or ratio and the engine throttle is substantially closed or in the lower portion of the control range.

In a modification the churn brake is effective at low vehicle speed and then when engine braking is effective, disabled by a vehicle speed responsive governor.

An object of the invention is to provide in a torque converter having a pump element controllable at times to provide blades of small area whereby the converter has a low capacity and controllable at other times to provide blades of larger area whereby the converter has a higher capacity.

Another object of the invention is to provide a dual capacity torque converter, a pump directly driven by the drive member having first pump blades and additional pump blades operable at times to cooperate with the first pump blades to increase the capacity thereof.

Another object of the invention is to provide a dual capacity torque converter having a first pump member continuously driven by the drive member and a second bladed pump member normally mounted freely in said converter but connectible to said drive member to increase the capacity of the torque converter.

Another object of the invention is to provide in a torque converter a first pump always connected to the driven member, a second pump which may freewheel or be connected to the drive member to provide a dual capacity torque converter and which may be held stationary to provide a hydrodynamic braking.

Another object of the invention is to provide in a torque converter an intermediate bladed element which may be held stationary to provide hydrodynamic braking.

Another object of the invention is to provide in a torque converter having a dual capacity pump with a normally driven first pump member and a normally freewheeling second pump member and a control system to clutch the second pump member to the first pump member when the throttle is moved to the full throttle position and to hold the second pump element stationary to provide hydrodynamic braking when the transmission is placed in a lower ratio and during low throttle operation.

These and more specific objects of the invention will be apparent from the following description of a preferred embodiment of the invention illustrated in the accompanying drawings in which:

FIG. 2 shows curves illustrating the operation of the dual capacity converter.

FIG. 3 is a hydraulic schematic diagram of the control system.

FIG. 4 is a hydraulic schematic diagram of a modified control system.

Figure 1:
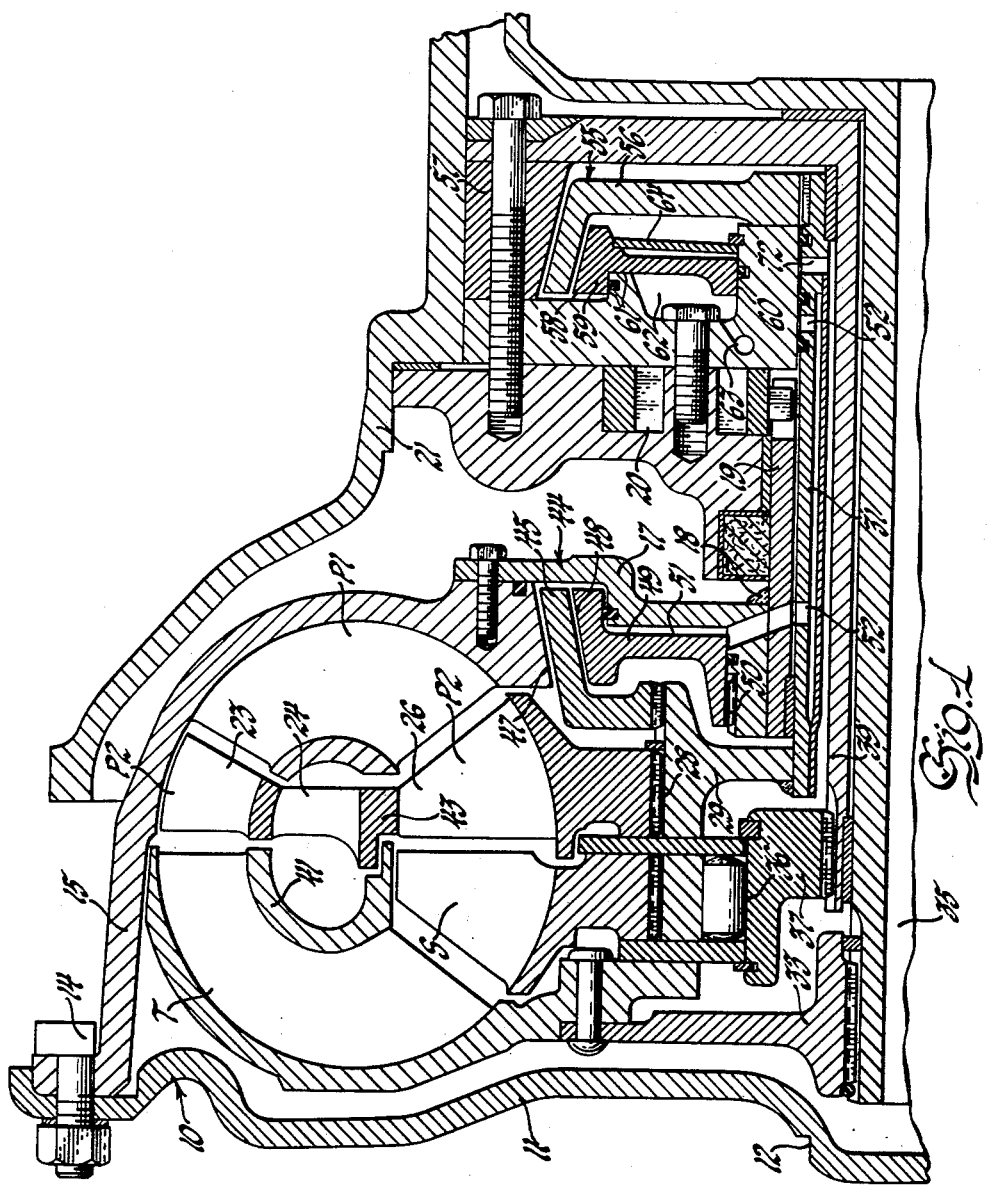
FIG. 1 is a sectional view of the torque converter.

The torque converter illustrated in FIG. 1 may be employed with a suitable multiple ratio transmission of the type shown in the Christenson et al. application S.N. 554,866 filed December 22, 1955, or the Breting et al. application S.N. 551,068 filed December 5, 1955. The pump housing 10 is driven by an engine (not shown) and has a forward wall 11 which has a central pilot bearing 12 to locate the housing 10 in the adjacent end of the engine shaft. The forward plate or wall 11 is secured by bolts 14 to the outer shell 15 of the bladed first pump member P1. The inner portion of the shell 15 has a hub 17 which is secured by splines or welding 18 to the pump sleeve shaft 19 which drives the pump 20 located in the stationary transmission housing 21.

The second pump member P2 is a bladed element having outer blades 23, central connecting arms 24 and inner blades 26, and a hub portion connected by splines 28 to the hub 29 which is secured to the sleeve shaft 31 to secure the second pump P2 to shaft 31. The bladed turbine member T is connected by the turbine hub 33 which is splined to the output shaft 35. The bladed stator member S is mounted by means of the one-way roller clutch 36 and hub 37 splined on the ground sleeve 39 which is fixed to the transmission housing 21. The inner shroud 41 of the turbine member T extends across the top of the stator member S and overlaps the portion of the shroud 43 of the blades 26 of the second pump member in order to reduce leakage from the torus-shaped fluid flow chamber through the spaces between the turbine, stator and second pump members to the central portion within the converter torus.

The dual capacity cone clutch 44 for driving the second pump to provide increased capacity has a driven cone member 45 connected by splines to the second pump hub 29 and located between the outer driving cone surface 47 on the first pump shell 15 and the inner driving surface 48 on the piston 49. The annular piston 49 has a Z-shaped section and is guided by splines 50 on the piston 49 and hub 17 for non-rotative reciprocal movement on the inner portion of the hub 17 which has a similar Z-shaped section and thus forms a fluid chamber or cylinder 51. The fluid passage or dual capacity clutch line 52 supplies fluid to the chamber 51 to actuate clutch 44 and the fluid under pressure in the torque converter chamber returns the piston to disengage the clutch 44.

The second pump P2 is also connected by the sleeve shaft 31 to be grounded or held stationary by a brake 55 to provide hydrodynamic braking. Brake 55 has a cone clutch member 56 fixed to shaft 31 and located between a cone brake surface 57 fixed to the transmission housing 21 and a cone brake surface 58 formed on the outer diameter of annular piston 59. Piston 59 has two annular internal surfaces cooperating with the external annular surfaces 60 and 61 on the housing 21 to form the fluid chamber or cylinder 62. Pins or splines on the housing 21 may cooperate with the piston 59 to prevent rotation. Fluid to actuate the piston 59 and engage the brake is supplied by brake line 63 and the spring 64 retracts the piston.

A suitable hydraulic control system for this torque converter and particularly the dual capacity clutch 44 and the brake 55 is illustrated in FIG. 3. Fluid, such as oil, is supplied from a suitable sump 70 through pump feed line 71 to the pump 20 or any suitable transmission pump which provides fluid under pressure either directly or via conventional pressure regulating valves to the main line 72. One branch of the main line is connected to the converter inlet and the converter outlet line 73 conveys fluid from the torque converter to the cooler 74 and through check valve 75 to the sump 70.

The main line 72 is also connected to the manual valve 78 which has a valve element 79 mounted in the bore 81. Line 72 is connected to the closed end of the bore 81 and flows through the passage 82 in the valve 79 to the space between the lands $a$ and $b$. Valve 79 is movable to the reverse, low, intermediate and high positions and held in each of these positions by a spring detent 83 which cooperates with grooves at each of these positions of the valve member 79 to hold the valve in position so that the fluid is connected between lands $a$ and $b$ in each position, respectively, to the reverse line 84, the low line 86, intermediate line 87 and high line 88. These lines may be connected directly to servo motors of a multiratio transmission of the type shown in the above application S.N. 551,068, or they may be low, intermediate and high range lines of automatic range-type control for multiratio transmissions as shown in the above application S.N. 554,866, or the lines connected to the servo motors in an automatic multiratio transmission control system.

The main line 72 is also connected to a throttle control valve 91 which has a valve element 92 having lands $a$, $b$ and $c$ located in uniform bore 94 and large land $d$. At the closed end of the bore a spring 96 acts upon the end land $a$ to hold the valve in contact with the throttle pedal actuated cam 97 shown in the closed throttle position. The spring chamber at the end of the bore 94 is vented by exhaust 101. In the space between the lands $a$ and $b$ with the valve in the closed throttle position shown, the branch of the low ratio line 86 is connected adjacent the land $a$ and the brake line 63 is connected adjacent the land $d$. The extension of line 63 through the annular groove in the valve bore 94 has an orifice 102 and is connected to exhaust 103. The dual capacity clutch supply line 106 is connected to the bore 94 between lands $b$ and $c$, adjacent land $d$. An extension of the line 106 is connected through the orifice 107 to exhaust port 108. The orifices 102 and 107 provide sufficient leakage to drain the fluid actuating devices of the brake and clutch when the fluid supply is cut off and insufficient to interfere with the supply of fluid for actuation. The main line 72 is connected to the bore 94 at port 111 immediately below line 106 to provide the fluid supply for the dual capacity clutch. The line 72 is also connected to the port 112 adjacent the lower end of the bore 94 for the hydraulic detent provided when land $d$ enters the enlarged counterbore 114. The shoulder 115 on land $d$ limits upward movement of the valve 92.

The dual capacity clutch supply line 106 is connected to the disconnect valve 121, which consists of a spool valve 122 located in a bore 123. The bore 123 is closed at both ends and at the upper end a spring 126 is located between the end of the bore and the valve spool to urge the valve 122 down to the open position connecting line 106 to the dual capacity clutch line 52. The spring chamber is vented to exhaust 127 by line 128. The low range line 86 is connected to the lower end of the bore 123 and acts upon the spool valve 122 to move the valve upwardly against the spring to the closed position blocking line 106 and connecting line 52 via line 129 to exhaust 127.

*Operation*

The dual capacity converter provides two capacity ranges of operation. The low capacity range is obtained when clutch 44 is released so that only the first pump P1 is connected to the input and provides a higher horsepower output at low output speed as indicated by the "clutch released" curve in FIG. 2. The higher horsepower output is obtained at low output speeds since the low capacity converter permits engine operation at higher speeds to produce maximum engine horsepower. At high output speeds the low capacity converter provides a somewhat lower horsepower output since the increased slip reduces the efficiency. The high capacity range is obtained when clutch 45 is engaged so that both the first and second pumps P1 and P2 are driven by the input as a unitary higher capacity pump. Each of the composite blades has a larger area, a larger radius to the outlet edge and a continuous streamline of form in which the blades 26 forming the inlet portion are shaped and positioned at an angle for minimum turbulence, the blades of pump P1 form the central part and the blades 23 forming the outlet portion are shaped and positioned to provide increased capacity. Thus with the same input the composite bladed turbine provides a lower horsepower output at low output speeds as indicated by the "clutch engaged" curve in FIG. 2. The higher capacity converter is always more efficient and thus at higher output speeds when the engine delivers maximum horsepower provides a greater horsepower output than the low capacity converter.

These operating characteristics in the low capacity range provide provide a high performance range particularly suitable for use in vehicle drives with low gear ratios for starting, particularly under adverse conditions, and in the high ratio when at full throttle for passing or hill-climbing. The high capacity converter would then be used for normal driving because of its greater efficiency.

The hydrodynamic braking is provided by engaging the brake 55 to ground to hold the second pump P2 to provide a stator to cooperate with the rotor or turbine T, which is driven by the output which in vehicle transmissions is driven by the drive wheels.

The dual capacity clutch 44 is arranged compactly and concentrically within the first pump P1. Clutch 44 is engaged by the higher pressure fluid supplied by line 52 to cylinder 51 which moves the piston against the force exerted on the other side thereof by the low pressure fluid maintained in the torque converter chamber by relief valve 75 and released by this low pressure fluid in the torque converter chamber. Though the flow through the converter and the low pressure relief valve 75 is generally sufficient to maintain this pressure differential between the pressure supplied to fluid motor cylinder 51 and the torque converter chamber, it may be desirable to employ a pressure reducing valve in line 72 adjacent the converter inlet.

When the converter is used without additional transmission gearing, the disconnect valve 121 may be directly manually controlled to provide low capacity operation or permit high capacity operation of the converter. When a multi-ratio transmission is employed with this torque converter a fluid pressure operative in a low ratio, such as, the fluid pressure supplied to the low line 86 by the manual valve 78 in the low position or by a manual range selector valve or automatic ratio control valve in a more fully automatic transmission may be employed to engage the clutch 55 and disengage the capacity clutch 44. The fluid supplied by line 86 to the lower end of disconnect valve 121 moves the valve 122 to the closed position blocking the supply line 106 and connecting dual capacity clutch line 52 to exhaust 127 to prevent engagement of the dual capacity clutch whenever the transmission is in low. Thus the converter always has a low capacity for high performance when valve 121 is closed either manually or by fluid pressure in the low line 86 regardless of the position of throttle controlled valve 92.

The low ratio supply line 86 or a manually controlled supply line is also used as a supply line for the hydrodynamic brake line 63 and thus the brake can only be engaged when the transmission is in low ratio and the throttle is closed or partially opened. As the throttle is advanced in low ratio, the land b blocks the connection between the supply line 86 and the brake clutch line 63 and connects the line 63 through the orifice 102 to exhaust 103 to disengage the brake clutch 55 and brake. The cam 97 and the land b are arranged so that the throttle controlled valve 91 disengages the brake 55 on initial movement from the closed throttle position.

Wehn the transmission is placed by the manual valve in intermediate or high, the disconnect valve 121 is held open by spring 126 connecting the supply line 106 to the dual capacity clutch line 52. During the normal driving range from closed to substantially full throttle, the main line 72 will be connected between lands b and c of the throttle controlled valve 91 to supply line 106 and via disconnect valve 121 and line 52 to cylinder 51 to engage the dual capacity clutch to provide the high capacity range. When the vehicle operator wishes to provide extra performance such as when passing another vehicle, he moves the throttle pedal substantially to the full throttle position or just beyond and the cam 97 will move the valve 92 to the detent position. In this construction a hydraulic detent is provided by the branch of main line 72 which is connected to the port 112 to supply fluid, when the valve 92 is in the detent position, between the unbalanced lands c and d. Since land d is then in the large bore 114, the fluid acts on the unbalanced area of land d to offer an additional resistance to move the valve, to indicate to the operator that the valve is in detent position. In this position, land c blocks connection between main line 72 and the supply line 106 and connects supply line 106 through the annular passage in the valve body to orifice 107 and exhaust 108 to disengage the dual capacity clutch 44 to provide the low capacity converter range for high performance.

When the manual valve 78 is in intermediate, high and reverse ranges, regardless of the position of the throttle valve 91, the brake clutch is disengaged exhausting to exhaust 103 since low ratio line 86 does not provide a fluid supply.

The modified control system shown in FIG. 4 is similar to the above control system and in addition employs a vehicle speed governor actuated valve 136 in the system to disconnect the brake 55 and to re-engage the dual capacity clutch to provide a high capacity torque converter above 30 to 40 miles per hour where it is contemplated the engine braking in low ratio will be sufficient so that the hydrodynamic brake is no longer needed. In this modification the torque converter 10, the fluid supply system for the torque converter, the manual valve 78, the throttle control valve 91, and the disconnect valve 121 are the same as described above in connection with the control system illustrated in FIG. 3. Though disconnect valve 121 is the same, it is no longer actuated by low ratio line 86 but is actuated by a branch of brake line 63 so that disconnect valve 121 is actuated to disconnect the dual capacity clutch line 52 whenever the fluid is supplied to brake line 63 to engage the brake 55. A governor disconnect valve 136 has been added in the low ratio line 86 to disconnect the supply to the throttle control valve 91 for the brake 55 whenever the output speed exceeds a certain value, for example, in a vehicle transmission when the vehicle speed exceeds approximately 30 to 40 miles per hour.

The governor disconnect valve has a spool element 137 located in a closed bore 138 and maintained at the lower end of the bore by spring 139. An output or vehicle speed governor driven at a speed proportional to the output or vehicle speed supplies pressure in the line 141 which is connected to the lower end of bore 138 to act on the end of spool element 137. With the spool 137 held in the normal position by spring 139, the low servo line 86 is connected to port 142 adjacent the lower land, and port 143 is connected to the continuation of the low servo line 86'. An exhaust 144 has a port 145 blocked by the upper land and a port 146 which is always connected to the spring chamber at the end of the bore 138. When the vehicle speed exceeds 30 to 40 miles per hour the increased governor pressure in line 141 will move the valve spool 137 up blocking the port 142 and low ratio line 86 and connecting the extension of the low ratio line 86' to the exhaust port 145 to vent the brake clutch line 63.

In modification shown in FIG. 4 the dual capacity clutch 44 is engaged to drive both the first pump P1 and the second pump P2 in all drive ratios throughout the normal throttle range and is disengaged when the throttle is advanced to the full throttle or detent position. Fluid under pressure is normally supplied by the pump 20 and line 72 between the lands b and c of the throttle controlled valve 92 to the dual capacity clutch line 106 which is, except when the brake clutch 55 is applied, connected by the disconnect valve 121 to the dual capacity clutch line 52. When the throttle control valve 92 is in the detent position, the land c blocks the line 72 and the dual capacity clutch 44 is exhausted through lines 52 and 106 and orifice 107 to exhaust 108.

The churn brake 55 may be applied only when the transmission is in a low ratio since the supply is derived from the low ratio line 86. When the throttle valve is in a throttle controlled position where the throttle normally provides a vehicle speed less than 30 to 40 miles per hour, the line 86 is connected through the governor disconnect valve 136 to the supply line 86' which is connected between the lands a and b to the brake line 63 to engage the brake 55. The flow through orifice 102 to exhaust 103 is insufficient to interfere with the engagement of the brake 55. Since the dual capacity clutch 44 would normally be engaged at this time, the brake line 63 is connected to actuate the disconnect valve 121 to block line 106 and connect the clutch line 52 to exhaust 127 to disengage dual capacity clutch 44. If the throttle is advanced to the position normally providing a vehicle speed exceeding 30 to 40 miles per hour, the land $b$ will block the connection between supply line 86' and the brake line 63 to disengage the brake and permit disconnect valve 121 to return to its normal position to re-engage the dual capacity clutch 44. If the vehicle speed exceeds 30 to 40 miles an hour, the increased pressure in line 141 will actuate governor disconnect valve 136 to block the low ratio line 86 and connect the supply line 86' to exhaust 144 and disengage the brake clutch 55. The disengagement of the brake 55 and the accompanying reduction in pressure in the brake line 63 will open the disconnect valve 121 and re-engage the dual capacity clutch 44.

With this arrangement the brake 55 is engaged to provide superior engine braking at throttle positions normally providing less than 30 to 40 miles per hour and at vehicle speeds less than 30 to 40 miles per hour. If the throttle is advanced beyond the normal 30 to 40 miles per hour position, it seems certain that the driver would not wish to have braking action. When the vehicle speed exceeds 30 to 40 miles per hour, the engine braking provided by the high capacity torque converter driving the engine will provide sufficient braking.

The above-described preferred embodiment is illustrative of the invention which as will be appreciated by those skilled in the art is subject to modifications within the scope of the appended claims.

I claim:

1. In a transmission for an engine having a throttle movable from a closed to a full throttle position to control the supply of fuel to the engine, an input member, an output member, a hydrodynamic torque converter having a bladed first pump member connected to said input member operable as a pump when driven and as a hydrodynamic brake stator when retarded, a bladed second pump member rotatably mounted in said torque converter, turbine means connected to drive said output member, a stator member, a first clutch to connect said second pump member to said input member, holding means to hold said second pump member stationary, means to engage said first clutch to provide a higher capacity torque converter when the throttle is in a normal range between closed throttle and substantially full throttle positions and means to engage said holding means to provide hydrodynamic braking when the throttle is in the lower portion of the range of throttle positions below said normal range.

2. In a transmission for an engine having a throttle movable from a closed to a substantially full throttle position and a control position to control the supply of fuel to the engine, an input member, an output member, a hydrodynamic torque converter having a bladed pump connected to said input member, said bladed member having capacity control means to provide a small capacity under a first condition of torque converter operation and a large capacity under a second condition of torque converter operation, turbine means connected to drive said output member, a stator member operative as a stator under both conditions of operation and means to actuate said capacity means to provide said large capacity torque converter when the throttle is in the normal range between closed throttle and substantially full throttle position and to provide said small capacity torque converter when the throttle is in said control position.

3. In a transmission for an engine having a throttle movable from a closed to a full throttle position to control the supply of fuel to the engine, an input member driven by the engine, an output member, a hydrodynamic torque converter including a pump having blades connected to said input member and having means to provide under a first condition of operation a low capacity converter and under a second condition of operation a high capacity converter, a multiratio gear unit having a low and a high ratio, a turbine connected to drive said gear unit, said gear unit driving said output member, a stator member, control means to actuate said means to selectively effect said first condition of operation when the throttle is substantially at the full throttle position and said second condition of operation when the throttle is in the normal driving range between closed throttle to said substantially full throttle position, and means to disable said control means to prevent selection of said second condition when said gear unit is in a low ratio.

4. In a hydrodynamic torque converter, an input member, an output member, pump member having blades connected to said input means having conditioning means to provide under a first condition of operation a low capacity converter, under a second condition of operation a high capacity converter and under a third condition of operation a hydrodynamic brake stator, turbine means driven by said pump means in said first and second conditions of operation and retarded by said pump means in said third condition of operation connected to said output member, a stator member independent of said pump means, and control means to actuate said conditioning means to selectively effect said first condition of operation and said second condition of operation and said third condition of operation.

5. In a transmission for an engine having a throttle movable from a closed to a full throttle position to control the supply of fuel to the engine, an input member driven by the engine, an output member, a hydrodynamic torque converter including pump means having blades connected to said input member having means to provide under a first condition of operation a low capacity converter, under a second condition of operation a high capacity converter and under a third condition of operation a hydrodynamic brake stator, turbine means driven by said pump means in said first and second conditions of operation and retarded by said pump means in said third condition of operation connected to said output member, a stator member, and control means to actuate said means to selectively effect said first condition of operation when the throttle is substantially at the full throttle position and said second condition of operation when the throttle is in the normal driving range between closed throttle and said substantially full throttle position and said third condition of operation by a manual control only when said throttle is in the lower portion of the driving range.

6. In a transmission for an engine having a throttle movable from a closed to a full throttle position to control the supply of fuel to the engine, an input member, an output member, a hydrodynamic torque converter having a bladed pump connected to said input member and having capacity control means to provide a small capacity under a first condition of operation and a large capacity under a second condition of operation, turbine means, a multiratio gear unit having a low ratio and a high ratio, control means to engage said ratios, said turbine means being connected to drive said gear unit, said gear unit being connected to drive said output member, a stator member, means to actuate said capacity control means to provide a higher capacity torque converter when the throttle is in the normal range between closed and substantially the full throttle positions and disabling means to prevent operation of said last-mentioned means when the gear unit is in said low ratio.

7. In a transmission, an input member, an output member, a hydrodynamic torque converter including a pump means having blades connected to said input member having means to provide under a first condition of operation a low capacity converter, under a second condition of operation a high capacity converter and under a third condition of operation a hydrodynamic brake, a multiratio gear unit having a low and a high ratio, a turbine connected to drive said gear unit, said gear unit driving said output member, a stator member, control means to actuate said means to selectively effect said first condition of operation and said second condition of operation and said third condition of operation, means to disable said control means to prevent selection of said second condition when said gear unit is in a low ratio and means to disable said control means to prevent selection of said third condition when said gear unit is in a high ratio.

8. In a transmission for an engine having a throttle movable from a closed to a full throttle position to control the supply of fuel to the engine, an input member driven by the engine, an output member, a hydrodynamic torque converter including a pump having blades connected to said input member having means to provide under a first condition of operation a low capacity converter, under a second condition of operation a high capacity converter and under a third condition of operation a hydrodynamic brake, a multiratio gear unit having a low and a high ratio, a turbine connected to drive said gear unit, said gear unit driving said output member, a stator member, control means to actuate said means to selectively effect said first condition of operation when the throttle is substantially at the full throttle position and said second condition of operation when the throttle is in the normal driving range between closed throttle to said substantially full throttle position and said third condition of operation by a manual control when said throttle is in the lower portion of the driving range, means to disable said control means to prevent selection of said second condition when said gear unit is in a low ratio and means to disable said control means to prevent selection of said third condition when said gear unit is in a high ratio.

9. In a transmission for an engine having a throttle movable from a closed to a full throttle position to control the supply of fuel to the engine, an input member, an output member, a hydrodynamic torque converter having a bladed first pump member connected to said input member, a bladed second pump member rotatably mounted in said torque converter, turbine means, a multiratio gear unit having a low ratio and a high ratio, control means to engage said ratios, said turbine means being connected to drive said gear unit, said gear unit being connected to drive said output member, a stator member, a clutch to connect said second pump member to said input member, holding means to hold said second pump member stationary, means to engage said clutch to provide a higher capacity torque converter when the throttle is in the normal range between closed and substantially the full throttle positions and the gear unit is in said high ratio and means to engage said holding means to provide hydrodynamic braking when the throttle is in the lower portion of the range of throttle positions and the gear unit is in said low ratio.

10. In a transmission for an engine having a throttle movable from a closed to a full throttle position to control the supply of fuel to the engine, an input member, an output member, a hydrodynamic torque converter having a bladed first pump member connected to said input member, a bladed second pump member rotatably mounted in said torque converter, turbine means, a multiratio gear unit having a low ratio and a high ratio, control means to engage said ratios, said turbine means being connected to drive said gear unit, said gear unit being connected to drive said output member, a stator member, a clutch to connect said second pump member to said input member, clutch control means to engage said clutch to provide a higher capacity torque converter when the throttle is in the normal range between closed and substantially full throttle positions, and disabling means to prevent operation of said clutch control means when the gear unit is in said low ratio.

11. In a transmission for an engine having a throttle movable from a closed to a full throttle position to control the supply of fuel to the engine, an input member, an output member, a hydrodynamic torque converter having a bladed first pump member connected to said input member, a bladed second pump member rotatably mounted in said torque converter, turbine means, a multiratio gear unit having a low ratio and a high ratio, control means to engage said ratios, said turbine means being connected to drive said gear unit, said gear unit being connected to drive said output member, a stator member, a clutch to connect said second pump member to said input member, holding means to hold said second pump member stationary, clutch control means to engage said clutch to provide a higher capacity torque converter, first disabling means to prevent operation of said clutch control means when the gear unit is in said low ratio, holding control means to engage said holding means to provide hydrodynamic braking, and second disabling means to prevent operation of said holding means when the gear unit is in said high ratio.

12. In a transmission for an engine having a throttle movable from a closed to a full throttle position to control the supply of fuel to the engine, an input member, an output member, a hydrodynamic torque converter having a bladed first pump member connected to said input member, a bladed second pump member rotatably mounted in said torque converter, turbine means, a multiratio gear unit having a low ratio and a high ratio, control means to engage said ratios, said turbine means being connected to drive said gear unit, said gear unit being connected to drive said output member, a stator member, a clutch to connect said second pump member to said input member, holding means to hold said second pump member stationary, clutch control means to engage said clutch to provide a higher capacity torque converter when the throttle is in the normal range between closed and substantially full throttle positions, first disabling means to prevent engagement of said clutch when the gear unit is in said low ratio, holding control means to engage said holding means to provide hydrodynamic braking when the throttle is in the lower portion of the range of thottle positions, and second disabling means to prevent operation of said holding means when the gear unit is in said high ratio.

13. In a transmission for an engine having a throttle movable from a closed to a full throttle position to control the supply of fuel to the engine, an input member, an output member, a hydrodynamic torque converter having a bladed first pump member connected to said input member, a bladed second pump member rotatably mounted in said torque converter, turbine means, a multiratio gear unit having a low ratio and a high ratio, control means to engage said ratios, said turbine means being connected to drive said gear unit, said gear unit being connected to drive said output member, a stator member, a clutch to connect said second pump member to said input member, holding means to hold said second pump member stationary, clutch control means to engage said clutch to provide a higher capacity torque converter when the throttle is in the normal range between closed and substantially full throttle positions and disengage said clutch at substantially full throttle position, first disabling means to prevent engagement of said clutch when the gear unit is in said low ratio, holding control means to engage said holding means to provide hydrodynamic braking when the throttle is in the lower portion of the range of throttle positions, and second disabling means to prevent engagement of said holding means when the gear unit is in said high ratio.

14. In a hydrodynamic torque converter, an input member, an output member, a bladed first pump member connected to said input member, a bladed second pump member rotatably mounted in said torque converter and being operable as a pump when driven and operable as a hydrodynamic brake stator when retarded, turbine means connected to drive said output member, a stator member, a clutch to connect said second pump member to said input member, holding means to retard said second pump member stationary to hydrodynamically retard said turbine means, means to engage said clutch to provide a higher capacity torque converter and means to engage said holding means to provide hydrodynamic braking and prevent engagement of said clutch.

15. In a hydrodynamic torque converter, an input member, an output member, a bladed first pump member connected to said input member, a bladed second pump member rotatably mounted in said torque converter, turbine means connected to drive said output member, a stator member, a clutch to connect said second pump member to said input member, holding means to hold said second pump member stationary, means to engage said clutch to provide a higher capacity torque converter, means to engage said holding means to provide hydrodynamic braking and speed responsive means controlled in accordance with output member speed to prevent engagement of said holding means above a selected speed.

16. In a hydrodynamic torque converter, an input member, an output member, a pump member having blades connected to said input member having means to provide under a first condition of operation a low capacity converter, under a second condition of operation a high capacity converter and under a third condition of operation a hydrodynamic brake, a turbine connected to drive said output member, a stator member, control means to actuate said means to selectively effect said first condition of operation, said second condition of operation, and said third condition of operation, speed responsive means to overcontrol said control means to prevent effecting said third condition of operation above a selected output member speed and means to prevent effecting said second condition of operation responsive to effecting said third condition of operation.

17. In a transmission for an engine having a throttle movable from a closed to a full throttle position to control the supply of fuel to the engine, an input member, an output member, a hydrodynamic torque converter having a bladed first pump member connected to said input member, a bladed second pump member rotatably mounted in said torque converter, turbine means, a multiratio gear unit having a low ratio and a high ratio, control means to engage said ratios, said turbine means being connected to drive said gear unit, said gear unit connected to drive said output member, a stator member, a clutch to connect said second pump member to said input member, holding means to hold said second pump member stationary, means to engage said clutch to provide a lower capacity torque converter when the throttle is approximately at the full throttle position and the gear unit is in said high ratio, means to engage said holding means to provide hydrodynamic braking when the throttle is in the lower portion of the range of throttle positions and the gear unit is in said low ratio and means to disengage said holding means in response to an increase in output member speed.

18. In a transmission for an engine having a throttle movable from a closed to a full throttle position to control the supply of fuel to the engine, an input member driven by the engine, an output member, a hydrodynamic torque converter including pump means having controllable blades connectable to said input member to provide under a first condition of operation a low capacity converter, under a second condition of operation a high capacity converter and under a third condition of operation a hydrodynamic brake stator, a turbine driven by said pump under said first and second conditions of operation and retarded under said third condition of operation connected to said output member, a stator member, control means to actuate said means to selectively effect said first condition of operation when the throttle is substantially at the full throttle position, said second condition of operation when the throttle is in the normal driving range between closed throttle to said substantially full throttle position and said third condition of operation by a manual control and speed responsive means controlled by the speed of the output member to prevent effecting said third condition of operation above a selected speed.

19. In a hydrodynamic torque converter, an input member, an output member, a bladed first pump member connected to said input member, a bladed second pump member rotatably mounted in said torque converter, turbine means connected to drive said output member, a stator member, means to prevent at least reverse rotation of said stator member, a first clutch operable by a first fluid motor to connect said second pump member to said input member, holding means operable by a second fluid motor to hold said second pump member stationary to provide hydrodynamic braking, a source of fluid, valve means operative to supply fluid to actuate said first fluid motor to actuate said clutch to provide a low or high capacity torque converter and valve means to supply fluid to said second fluid motor to actuate said holding means to control the hydrodynamic braking and to actuate said first fluid motor to provide a low capacity torque converter.

20. In a hydrodynamic torque converter, a housing, an input member, an output member, turbine means connected to drive said output member, pump means including a first pump member having first blades providing a low capacity pump means connected to said input member and a second pump member mounted in said torque converter for rotation in both directions and having second blades connectable for rotation with said first blades to provide a higher capacity pump means and retardable with respect to said housing to hydrodynamically brake said turbine means, a stator member, means preventing at least reverse rotation of said stator member, a clutch to connect said second pump member to said input member, holding means to retard said second pump member, means to engage said clutch to provide a higher capacity torque converter and means to engage said holding means to retard said second pump member to hydrodynamically brake said turbine.

21. In a hydrodynamic torque converter, an input member, an output member, a first pump member having a bladed portion connected to said input member, a bladed second pump member rotatably mounted in said torque converter adjacent said bladed portion of said first pump operable as a pump when driven and as a hydrodynamic brake stator when retarded, turbine means connected to drive said output member, a stator member mounted on a ground sleeve, said first pump having a hub portion rotatably mounted on said ground sleeve and located concentrically within said bladed portion, a clutch operable by a first fluid motor to connect said second pump member to said first pump member, said first fluid motor consisting of a piston located in a cylinder formed in said hub, holding means operable by a second fluid motor to retard said second pump member to provide hydrodynamic braking, a source of fluid, valve means operative to supply fluid to actuate said first fluid motor to engage said clutch to provide a high capacity torque converter and to disengage said clutch to provide a low capacity torque converter, and valve means to supply fluid to said second fluid motor to actuate said holding means to control the hydrodynamic braking.

22. In a hydrodynamic torque converter, an input member, an output member, turbine means connected to drive said output member, a bladed first pump member connected to said input member, a bladed second pump member rotatably mounted in said torque converter and having blades shaped to increase the capacity of said bladed first pump member when said bladed second pump member is driven and to hydrodynamically retard said turbine means when rotation of said bladed second pump member is retarded, a stator member, a clutch operable by a first fluid motor to connect said second pump member to said input member, a holding means operable by a second fluid motor to hold said second pump member stationary to provide hydrodynamic braking, a source of fluid, valve means operative to supply fluid to actuate said first fluid motor to selectively actuate said first clutch to provide a low and high capacity torque converter and valve means to supply fluid to said second fluid motor to actuate said holding means to control the hydrodynamic braking.

23. In a transmission for an engine having a throttle movable from a closed to a substantially full throttle position to a control position to control the supply of fuel to the engine, an input member, an output member, turbine means connected to drive said output member, a hydrodynamic torque converter having a bladed first pump member connected to said input member, a bladed second pump member rotatably mounted in said torque converter and having blades shaped to increase the capacity of said bladed first pump member when said bladed second pump member is driven, a stator member independent of said first and second pump members, said first and second pump members being rotatable relative to said stator member, a clutch to connect said second pump member to said input member, and means controlled by said throttle to engage said clutch to provide a higher capacity torque converter when the throttle is in the normal range between closed throttle and substantially full throttle positions and to disengage said clutch when said throttle is in said control position.

24. In a transmission, an input member, an output member, torque converter drive means connecting said input and output members, including first bladed means connected to said input member, second bladed means connected to said output member and third bladed means, control means operably connected to said third bladed means to control said third bladed means to provide a first driving connection between said members having one torque characteristic and a second drive connection between said members having another torque characteristic, hydrodynamic brake means operative to retard said third member, drive control means connected to said torque converter drive means to establish said first or said second driving connection, brake control means connected to said hydrodynamic brake means to operate said hydrodynamic brake means to retard said third bladed means, and intercontrol means connected between said drive control means and said brake control means to disestablish said second drive connection when said hydrodynamic brake is operated to retard said third bladed means.

25. In a transmission for an engine having a throttle movable from a closed position through an intermediate position to a full throttle position and a detent position to control the supply of fuel to the engine, an input member, an intermediate member, an output member, drive means connecting said input and intermediate members controllable to provide a first driving connection between said input and intermediate members and a second drive connection between said input and intermediate members, drive control means operated by said throttle and connected to said drive means to establish said first driving connection when said throttle is between said closed and full throttle positions and to establish said second driving condition in said detent position, hydrodynamic brake means connected to one of said members, brake control means operated by said throttle and connected to said hydrodynamic brake means to operate said hydrodynamic brake means only when said throttle is between said closed and intermediate positions, a ratio change means connecting said intermediate and output members operative to establish a low and a high ratio drive, ratio control means to selectively establish one ratio and to permit operation of said brake control means and to establish another ratio and prevent operation of said brake control means, and intercontrol means connected between said drive control means and said brake control means to disengage said second drive connection when said hydrodynamic brake is engaged.

26. In a drive mechanism for an engine having a throttle movable from a closed position through an intermediate position to a full throttle position to control the supply of fuel to the engine, an input member driven by the engine, an output member, brake means connected to one of said members and operative to brake one of said members, control means to operate said brake means to retard one of said members, and means controlled by said throttle to prevent operation of said control means to operate said brake at a throttle position between said intermediate position and said full throttle position.

27. The invention defined in claim 26 and governor means responsive to the speed of one of said members effective to prevent operation of said control means to operate said brake above a predetermined speed.

28. In a drive mechanism for an engine having a throttle movable from a closed position through an intermediate position to a full throttle position to control the supply of fuel, an input member, an output member, brake means connected to one of said members, control means effective to operate said brake means to retard one of said members, governor means responsive to the speed of one of said members to prevent operation of said control means to permit operation of said brake means above a predetermined speed, and means responsive to said throttle to prevent operation of said brake above said intermediate position and to permit operation of said brake below said intermediate position.

29. In a transmission for an engine having a throtttle movable from a closed position through an intermediate position to a full throttle position to control the supply of fuel, an input member, an output member, ratio drive means connecting said input and output members to establish a low and a high ratio drive, ratio control means connected to said ratio drive means to selectively establish said low or high ratio drive, hydrodynamic brake means connected to one of said members, brake control means connected to said hydrodynamic brake means to effect engagement of said hydrodynamic brake to retard one of said members, means connecting said ratio control means to said brake control means to prevent operation of said brake control means when said ratio control means is conditioned to establish one of said ratios and to permit operation of said brake control means to engage said hydrodynamic brake when said ratio control means is conditioned to establish the other of said ratios, and means responsive to said throttle to prevent operation of said hydrodynamic brake above said intermediate position and to permit operation of said hydrodynamic brake below said intermediate position.

30. In a hydrodynamic torque converter, an input member, an output member, turbine means connected to said output member, a bladed first pump member connected to said input member, a bladed second pump member rotatably mounted in said torque converter and having blades which are shaped to increase the capacity of said bladed first pump member when said second bladed pump member is driven and which act as hydrodynamic brake stator blades when rotation of said bladed second pump member is retarded, a stator member mounted in said torque converter for rotation in one direction independent of said first and second bladed pump members and said turbine means, means to connect said input member to said bladed second pump member to drive said bladed second pump member to increase the capacity of said torque converter, and means to retard rotation of said bladed second pump member to hydrodynamically brake said torque converter.

31. In a hydrodynamic torque converter, an input member, an output member turbine means connected to said output member, a bladed first pump member connected to said input member, a bladed second pump member rotatably mounted in said torque converter and having blades which are shaped to increase the capacity of said bladed first pump member when said second bladed pump member is driven and which act as hydrodynamic brake stator blades when rotation of said bladed second pump member is retarded, a stator member mounted in said torque converter, said turbine means, said bladed first pump member and said bladed second pump member being mounted for rotation independent of each other and said stator member, means to connect said input member to said bladed second pump member to drive said bladed second pump member to increase the capacity of said torque converter, and means to retard rotation of said bladed second pump member to hydrodynamically brake said torque converter.

32. In a hydrodynamic torque converter, an input member, an output member, turbine means connected to said output member, a bladed first pump member connected to said input member, a bladed second pump member rotatably mounted for free rotation in said torque converter and having blades which are shaped to increase the capacity of said bladed first pump member when said second bladed pump member is driven and which act as hydrodynamic brake stator blades when rotation of said bladed second pump member is retarded, a stator member, said second bladed pump member being rotatable independent of said stator member, said bladed first pump and stator member cooperating to drive said turbine means and said bladed second pump member freewheeling in a low capacity phase of torque converter operation, means connecting said bladed second pump member to said input member to drive said bladed second pump member to increase the capacity of said torque converter, and means to retard rotation of said bladed second pump member to hydrodynamically brake said torque converter.

33. In a hydrodynamic torque converter, an input member, an output member, a torque converter housing having located therein, a first bladed means drivingly connected to said input member, a second bladed means drivingly connected to said output member, a third bladed means, a bladed stator, said first, second and third bladed means being rotatable relative to said bladed stator in at least one condition of operation, control means connected to said third bladed means to provide a first fluid torque transmitting connection between said members having one torque characteristic and a second fluid torque transmitting connection between said members having another torque characteristic and to retard rotation of said third bladed means to hydrodynamically brake said output member.

34. The invention defined in claim 33 and said third bladed means having two rows of blades with a row located at each side of one of said other bladed means.

35. The invention defined in claim 20 and said second blades including two rows of blades with each row located on opposite sides of one of said first pump member or turbine means.

36. The invention defined in claim 4 and speed responsive means controlled in accordance with output member speed to prevent operation of said control means to actuate said conditioning means to provide said third condition of operation above a selected speed.

37. In a hydrodynamic torque as defined in claim 4 for an engine having a throttle movable from a closed to a full throttle position to control the supply of fuel to the engine and means responsive to a low throttle position to operate said control means to actuate said conditioning means to provide said third condition of operation.

38. The invention defined in claim 4 and a multiratio gear unit having a low ratio and a high ratio, said turbine means being connected by said multiratio gear unit to said output member, means to prevent operation of said control means to operate said conditioning means to provide said third condition of operation when said gear unit is in high ratio.

References Cited in the file of this patent

UNITED STATES PATENTS

| | | |
|---|---|---|
| 1,900,120 | Lysholm et al. | Mar. 7, 1933 |
| 2,205,794 | Jandasek | June 25, 1940 |
| 2,292,482 | Roche | Aug. 11, 1942 |
| 2,302,714 | Pollard | Nov. 24, 1942 |
| 2,381,682 | Mayner | Aug. 7, 1945 |
| 2,421,190 | Dodge | May 27, 1947 |
| 2,607,456 | Jandasek | Aug. 19, 1952 |
| 2,675,102 | Robinson | Apr. 13, 1954 |
| 2,771,972 | Thurber | Nov. 27, 1956 |
| 2,873,618 | De Lorean | Feb. 17, 1959 |

UNITED STATES PATENT OFFICE
CERTIFICATE OF CORRECTION

Patent No. 3,043,161 July 10, 1962

Robert M. Tuck

It is hereby certified that error appears in the above numbered patent requiring correction and that the said Letters Patent should read as corrected below.

Column 5, line 28, for "clutch" read -- brake --; line 51, for "Wehn" read -- When --; column 8, line 15, for "member", second occurrence, read -- means --; line 16, for "means", first occurrence, read -- member --.

Signed and sealed this 6th day of November 1962.

(SEAL)
Attest:

ERNEST W. SWIDER
Attesting Officer

DAVID L. LADD
Commissioner of Patents